United States Patent [19]

Close et al.

[11] 4,335,510
[45] Jun. 22, 1982

[54] STRING TRIMMER

[75] Inventors: Albert R. Close, Culver City; Winton Oster, Venice, both of Calif.

[73] Assignee: Black & Decker, Inc., Newark, Del.

[21] Appl. No.: 199,563

[22] Filed: Oct. 22, 1980

Related U.S. Application Data

[63] Continuation of Ser. No. 160,537, Jun. 18, 1980, abandoned.

[51] Int. Cl.³ .................................................. A01D 50/00
[52] U.S. Cl. ........................................ 30/276; 56/12.7
[58] Field of Search ................. 30/276, 347; 56/12.7, 56/295

[56] References Cited

U.S. PATENT DOCUMENTS

| | | | |
|---|---|---|---|
| 4,077,191 | 3/1978 | Pittinger | 30/276 |
| 4,091,536 | 5/1978 | Bartholomew | 30/276 |
| 4,148,141 | 4/1979 | Hoff | 30/276 |
| 4,205,439 | 6/1980 | Sweet | 30/276 |
| 4,223,440 | 9/1980 | Inaga | 30/276 |
| 4,233,735 | 11/1980 | Tsuchiya | 30/276 |
| 4,271,594 | 6/1981 | Kilmer | 30/276 |

Primary Examiner—Jimmy C. Peters
Attorney, Agent, or Firm—Louis L. Dachs

[57] ABSTRACT

A string trimmer having a handle, frame, motor and head. The head includes a housing formed by a cover and a base which contains a coiled supply of trimming line. The lower housing member has a central opening and a radial passage for the trimming line so that the trimming line can be fed from the storage coil through the central opening and the radial passage to project radially-outwardly from the head. Several types of convenient clamping arrangements are disclosed which clamp the trimming line during operation of the trimmer and release the trimming line for feeding of replacement portions of the trimming line.

9 Claims, 21 Drawing Figures

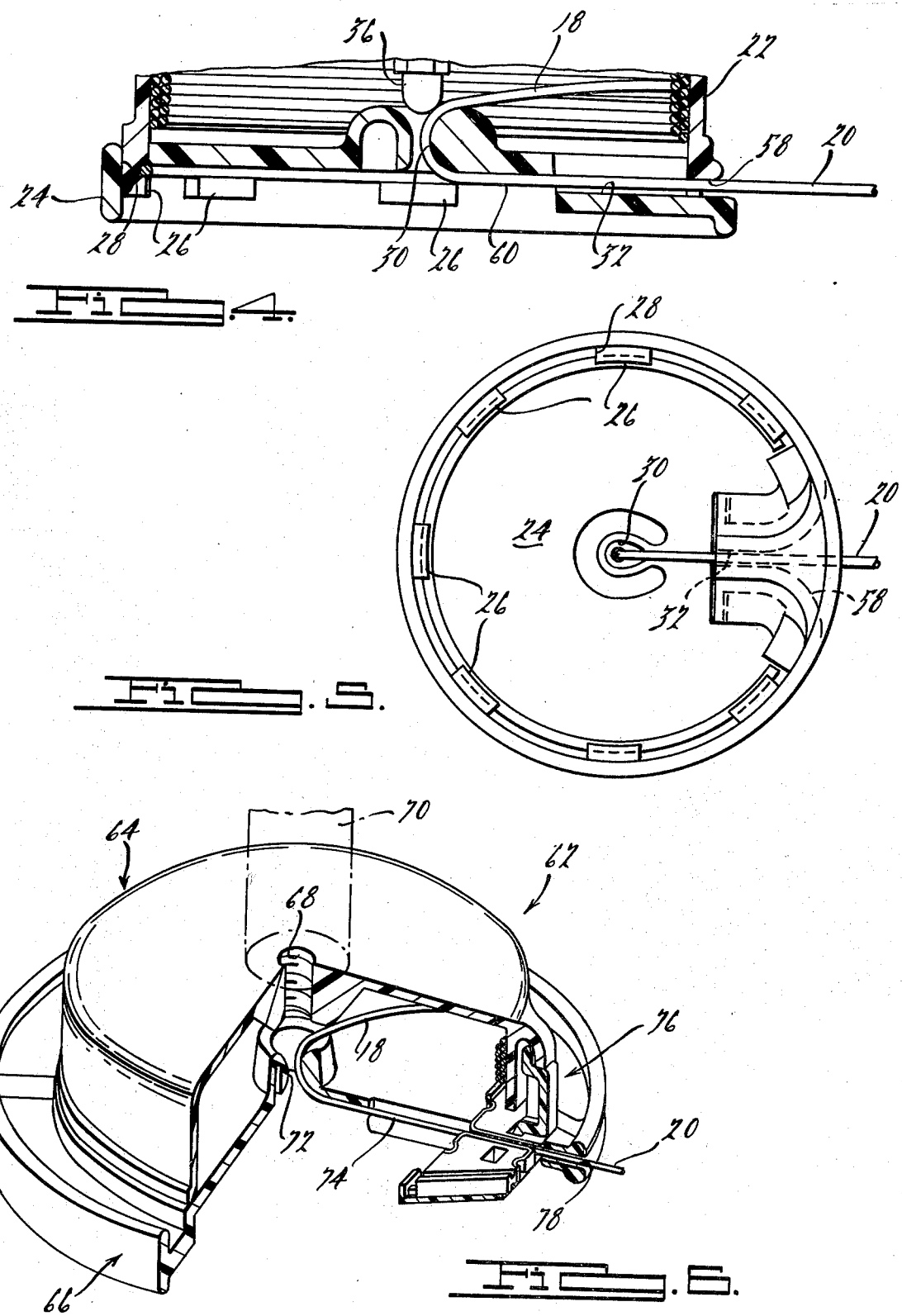

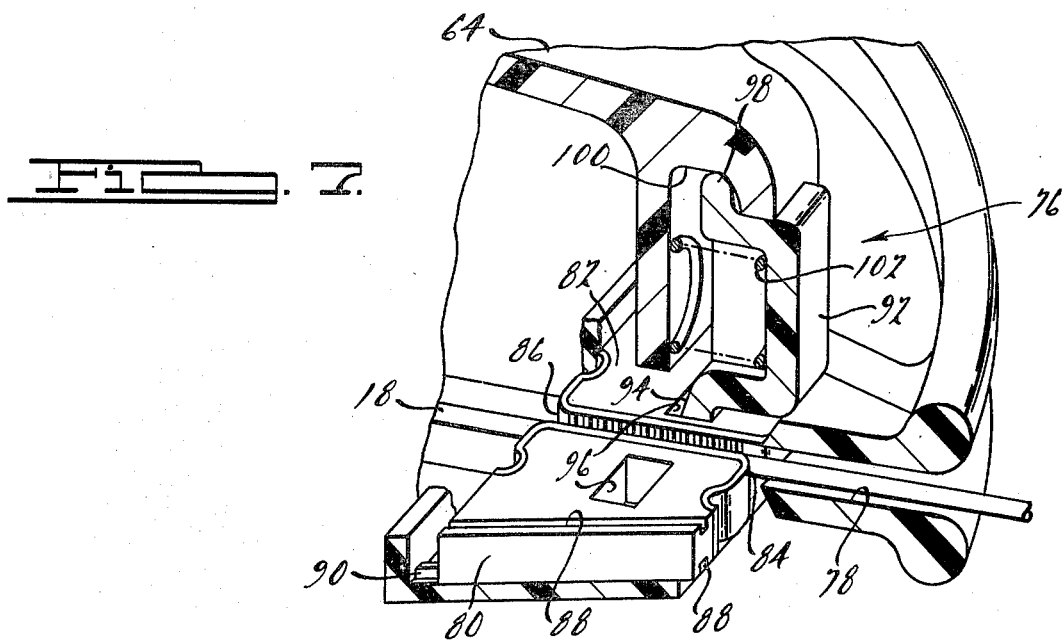
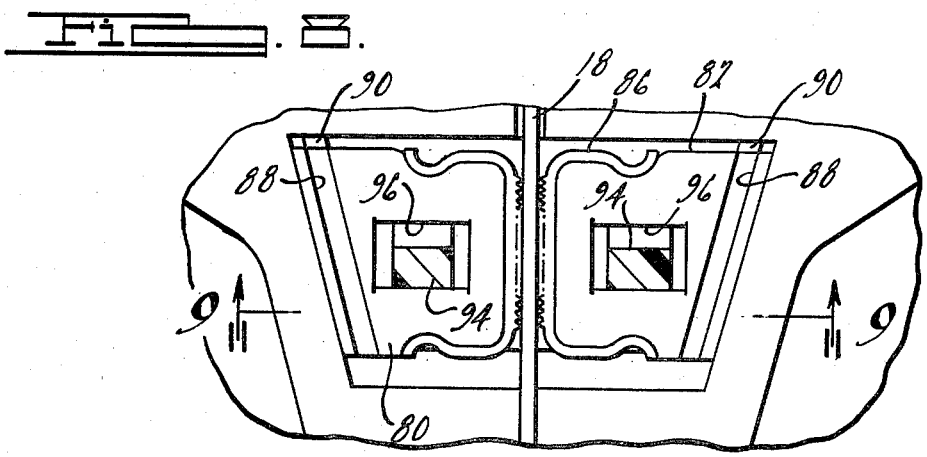
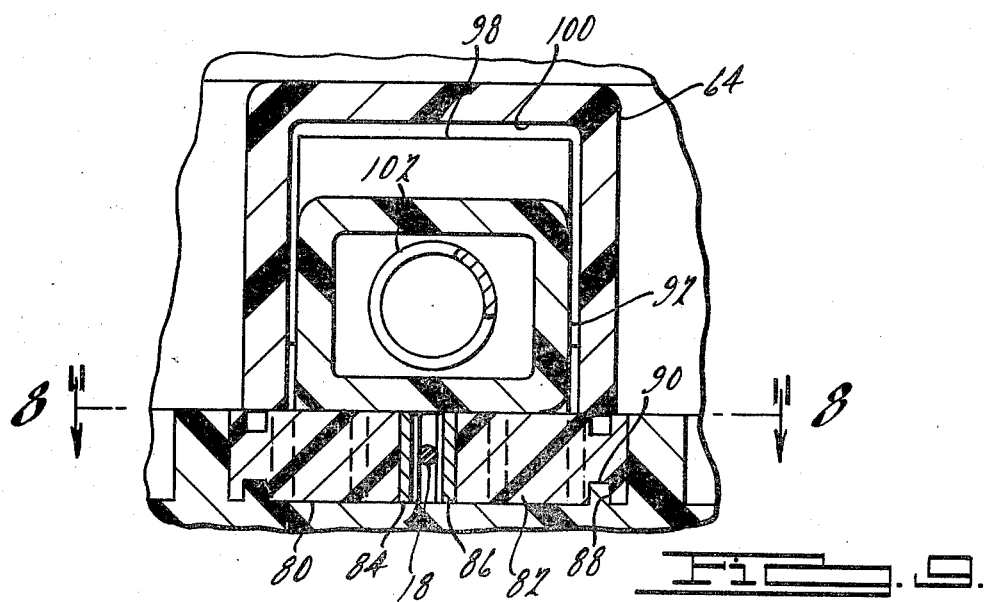

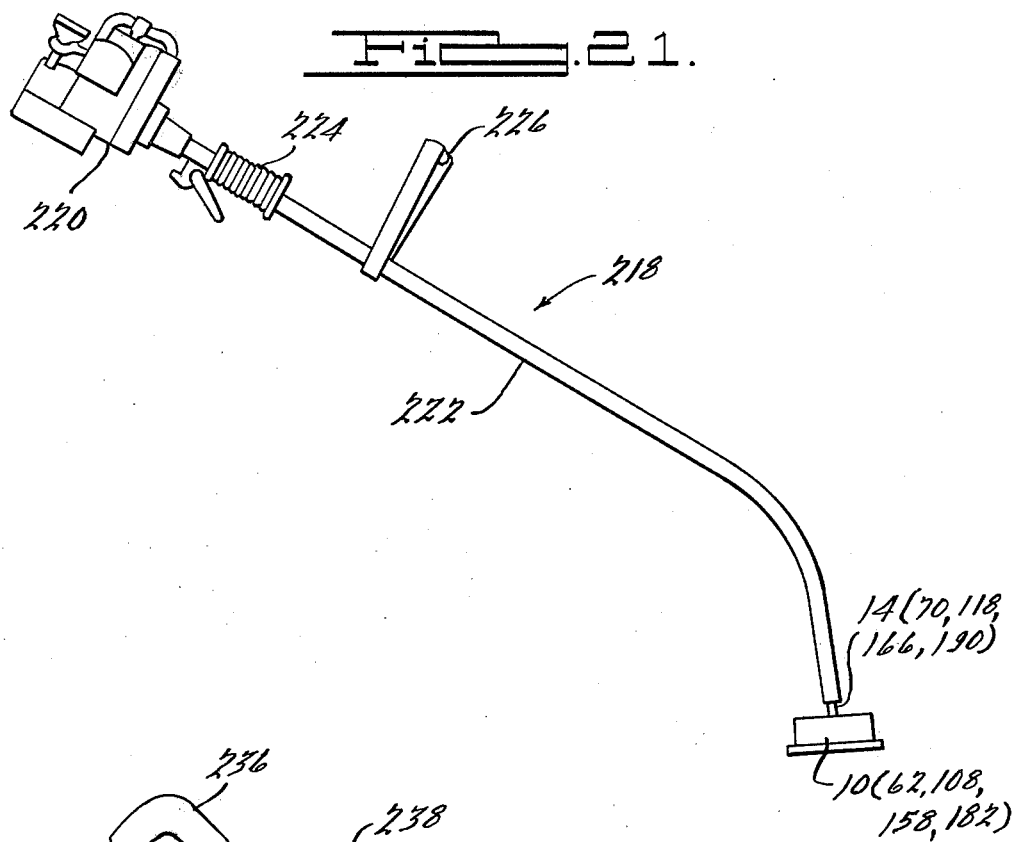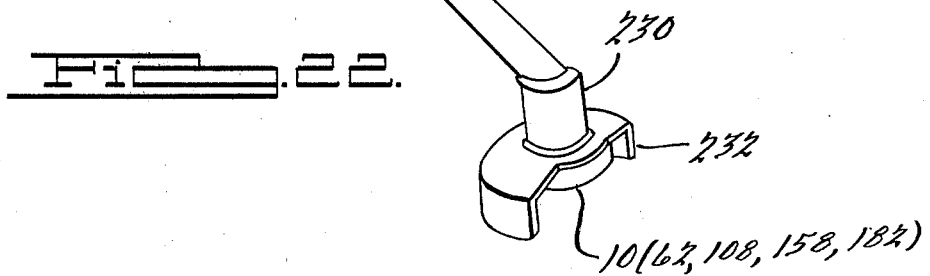

STRING TRIMMER

CROSS REFERENCE TO RELATED APPLICATION

This application is a continuation of Ser. No. 160,537 filed June 18, 1980, now abandoned.

BACKGROUND AND SUMMARY OF THE INVENTION

This invention relates to string trimmers. In recent years, string trimmers have enjoyed a well-deserved popularity. These trimmers use a string or flexible line as a cutting medium, usually a monofilament nylon line, which is rotated at high speed. String trimmers are efficient devices for trimming grass, weeds, etc.

Due to the stresses placed on the trimming line, the trimming line will break from time to time during use of the trimmer. To facilitate the replacement of broken segments of the trimming line, the commercial string trimmers usually carry a supply of the line and some arrangement for feeding the replacement line into operating position relative to the head of the trimmer. The commercially-used feeding arrangements can generally be broken down into two classes: (1) manual feed devices, and (2) automatic feed devices. The manual feed devices are usually less complicated and less costly than the automatic feed devices. Unfortunately, prior to the present time, the manual feed devices have been much less convenient than the automatic feed devices. In fact, it is apparent that the market for automatic feed devices has been created principally due to the inconvenience inherent in feeding line using the commercially-available manual feed devices.

This invention lies, in part, in the discovery that the inconvenience inherent in manual feed devices can be attributed in substantial part to the spool for storing the trimming line. Particularly, manual feed devices often require several operations involving the storage spool. Firstly, the spool must be released for rotation, then rotated, and finally secured from additional rotation. At the same time, the line must be guided or fed outwardly from the spool through an appropriate slot or opening. These steps often involve several manual manipulations of the feed device. Remembering that these devices are used only occasionally, the user may not develop the manipulative skills to enable him to efficiently accomplish these manual feed operations. In any event, the user is likely to find these manual feed operations to be inconvenient at least to some degree.

This invention provides a manual feed device which does not use a storage spool and thereby eliminates many of the manual feed difficulties. According to the present invention, the line is disposed in a coil within a spoolless housing in a fashion where it may be center fed from the coil without rotation of the bulk of the line. Since the spool is eliminated, there is no need to release the spool for feeding rotation, or to rotate the spool to feed line therefrom, or to secure the spool against rotation during operation of the trimmer. Since these manipulative steps are not required with the feed device of the present invention, the trimming line may be fed from the device with relative ease.

Also, importantly, this invention provides several novel structures for conveniently clamping or otherwise securing the line during operation of the trimmer and for releasing the line for feeding line from the storage coil.

The spoolless feature, in combination with the convenient line securing and releasing arrangements, provide a manual feed device for string trimmers which features a level of convenience nearing that of the automatic feed line trimmers. Moreover, the present invention provides a trimming head which is simple in construction and is relatively inexpensive to manufacture.

A first embodiment of a manual feed line trimmer according to this invention features a head comprising a housing formed of a cover and a base, for containing the coiled supply of trimming line. The cover is attached to the drive shaft of the motor for the trimmer so that the head may be rotated at high speed. The base has a central opening through which the line is fed and also preferably has a radial, partially-enclosed passage extending from the central opening to the periphery of the head through which the trimming line is fed to project radially-outwardly from the head so that it may accomplish its trimming task when the lead is rotated at high speed. The radial passage preferably has a rounded contour in the plane of rotation near the radially-outward portion of the passage to minimize line stress and breakage. The head also features a clamp comprising an axially movable clamping member associated with the housing which projects downwardly toward the central opening in the base and which is adapted to engage and clamp the line at the center opening in the base. The clamping member is preferably resiliently biased downwardly into the central opening of the base by an axial spring. The clamping member can be raised from the central opening in the base to release the line for feeding line from the head by movement of a lever which in turn rotates a cam integral with the lever which lifts the clamping member as it rotates.

A second exemplary embodiment of a string trimming head according to this invention also comprises a similar housing for storing the coiled trimming line. However, the second embodiment features a pair of jaw members or clamping members having opposed clamping surfaces for clamping the trimming line. The jaw members are disposed on opposite sides of a radial slot or passageway in the base through which the trimming line is fed to project the trimming line outwardly from the head. The jaw members are slidable generally in respective directions along a guideway for the jaw members so that radially-inward movement of the jaw members causes the opposed clamping surfaces of the jaw members to separate to release the trimming line, and so that radially-outward movement of the jaw members causes the opposed clamping surfaces of the jaw members to converge to clamp the trimming line. A button member can be provided which may be depressed for moving the jaw members radially-inwardly. The jaw members are biased radially-outwardly by a spring so that, upon release of the button member, the jaw members will slide radially-outwardly along the guideway under the influence of the spring to move close the jaw members into clamping engagement with the trimming line.

A third exemplary embodiment is similar to the second embodiment except that the jaw members are attached to the base for pivotal movement away from each other to release the trimming line when the button member is depressed and for pivotal movement toward each other under the influence of a spring to provide clamping engagement of the trimming line when the button member is released.

A fourth exemplary embodiment is similar to the first exemplary embodiment in that it features a clamp which is disposed adjacent to the central opening in the base. However, in the fourth embodiment, one clamping face of the clamp is on the cover and the other opposed face of the clamp is on the base. The cover and base are threadably engaged so that clamping faces are axially movable toward and away from each other by rotation of the cover relative to the base. Consequently, such relative rotation of the cover and base moves the clamping faces either together to secure the trimming line during operation of the trimmer or apart to release the trimming line for feeding replacement line from the storage coil, depending on the direction of relative rotation of the cover and base.

A fifth exemplary embodiment also uses a housing formed by a cover and a base for containing the storage coil. However, in the fifth embodiment, the clamping means is integrally formed with the base. The clamping means consists of a fixed jaw and a movable jaw, the latter being formed on a radially-inwardly-projecting lever which is cantileverly attached to the base near the periphery thereof. The fixed and movable jaws cooperate to secure the trimming line. The movable jaw lever may be axially-inwardly depressed to cause the jaws to separate to release the trimming line. Upon release of the movable jaw lever, the jaw members move toward each other by virtue of the resiliency of the material from which the base is formed so as to clamp the trimming line.

Note that each of the embodiments features a spoolless trimming head. Consequently, there is no spool which must be released for rotation, rotated to feed trimming line and then secured from rotation prior to operation of the trimmer. Each of the embodiments of this invention enables the user to merely pull the line from the trimmer when the clamp is released by depressing a clamping member or otherwise operating the clamp. In each case (except the fourth embodiment of this invention), release of the clamping member automatically reapplies the clamp so that the trimming head is again ready for operation.

Although the present invention is principally described in connection with a manual-feed string trimmer head, some of the principles and features of the present invention may be incorporated in an automatic-feed string trimmer head. Other features and advantages of the present invention will become apparent in view of the detailed description of the preferred embodiments appearing hereinafter.

BRIEF DESCRIPTION OF THE DRAWINGS

FIG. 4 is a partial cross-sectional view of the embodiment of FIG. 1 which illustrates the disposition and path of the trimming line;

FIG. 5 is a bottom elevation view of the embodiment of FIG. 1;

FIG. 6 is a perspective, partially-cutaway view of a second embodiment of the present invention;

FIG. 7 is an enlarged, perspective, partially-cutaway view of the clamping mechanism of the embodiment of FIG. 6;

FIG. 8 is a partial cross-sectional view of the clamping members of the embodiment of FIG. 6 taken along the lines 8—8 of FIG. 9;

FIG. 9 is a partial cross-sectional view of the clamping mechanism of the embodiment of FIG. 6 taken along the lines 9—9 of FIG. 8;

DETAIL DESCRIPTION OF THE PREFERRED EMBODIMENTS

Figure 1:
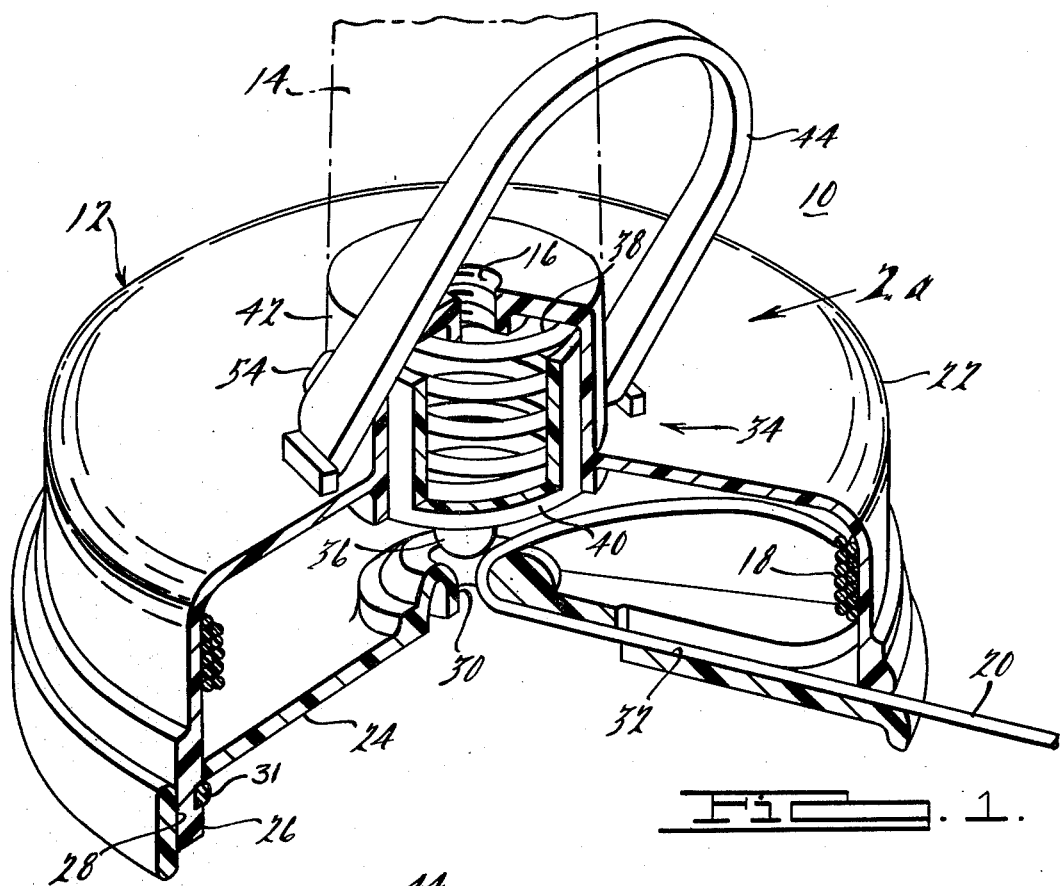
FIG. 1 is a perspective, partially-cutaway view of a first embodiment of the subject invention.

In FIG. 1, a first embodiment 10 of a spoolless string trimmer is illustrated. The trimmer 10 includes a head 12 which is adapted to be connected to a rotatable driveshaft 14 (shown by dashed lines), for example, by means of a threaded hole 16 which receives a similarly threaded end of the driveshaft 14. The driveshaft 14 is connected to a motor (not shown) which rotates the driveshaft 14 and the head 12 at high speed. A supply of line 18, preferably monofilament nylon line, is carried in the head 12 and has an end 20 which projects radially outwardly from the head so as to accomplish the cutting function when the head 12 is rotated at high speed.

The head 12 comprises a cover 22 and a base 24. The cover 22 is secured to the base 24 by virtue of downwardly-projecting tabs 26 on the cover 22 which interlock with openings 28 in the base 24. The cover 22 and the base 24, when interlocked as shown, form a housing for storage of the supply of cutting line 18. Note that the line 18 is disposed in a coil in a manner so that the free end of the line 18 may be fed from the center of the coil without rotation of the coil. In this regard, the line 18 is fed from the radially-innermost turns of the coil so that the line 18 may be depleted without rotation of the coil relative to the cover 22 and the base 24.

The base 24 has a central opening 30 having smooth rounded contours through which the cutting line 18 passes from the interior of the compartment formed by the cover 22 and the base 24 to the exterior of the head 12. The opening 30 is coaxial with the axis of rotation of the head 12. The line 18 is threaded laterally through a partially-enclosed, radially-extending passage 32 in the base 24 so that its end 20 projects radially outwardly from the passage 32. The disposition of the line 18 in the radially-extending passage 32 constrains the line 18 so that it will rotate with the head 12 and be properly supported for its cutting function. The line 18 is secured from slippage relative to the head 12 by a clamping mechanism illustrated generally at 34. The clamping mechanism 34 includes a clamping member 36 which features a spherical nose portion which projects downwardly towards, and is coaxial with, the rounded aperture 30 in the base 24. The clamping member 36 is resiliently-biased downwardly by a spring 38. More particularly, the spring 38 is disposed in a cup 40 which in turn is slideably disposed within an upper cylindrical housing 42 of the cover 22. The clamping member 36 is threadedly engaged with the bottom of the cup 40 so as to be coaxially secured thereto. The cup 40, and thus the clamping member 36, are axially movable within the cylindrical cavity formed by the upper housing 42. This axial movement is effected by a lever 44.

Figure 2A:
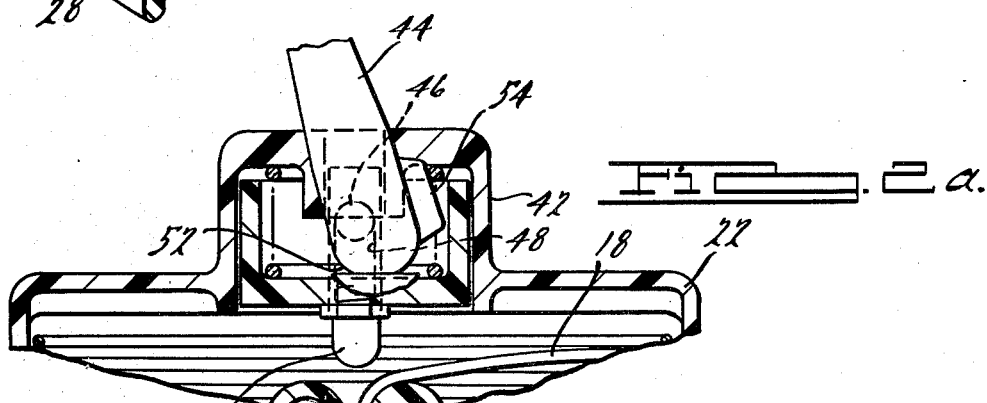
FIGS. 2a and 2b are partial cross-sectional views of a clamping mechanism of the embodiment of FIG. 1 illustrating the clamping mechanism in two operating positions.
Figures 2B, 3:
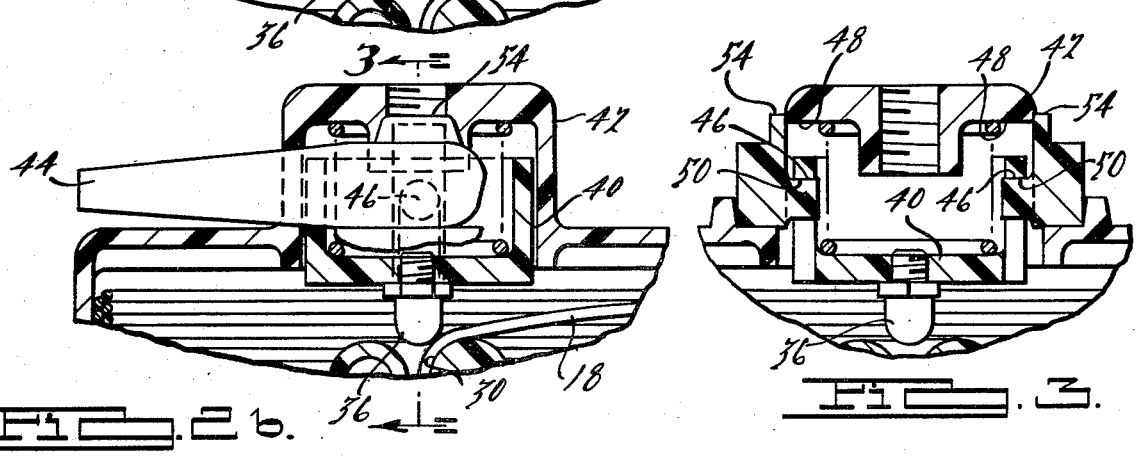
FIG. 3 is another partial cross-sectional view of the clamping mechanism of the embodiment of FIG. 1.

With reference additionally to FIGS. 2a, 2b and 3, the mechanism by which the lever 44 causes axial movement of the clamping member 36 will be explained. The lever 44 is pivotally connected to the upper cylindrical housing 42 by means of radially-inwardly extending cylindrical stubs 46 which extend through axially-extending slots 48 in the upper cylindrical housing 42 and into axially-extending slots 50 in the cup 40. The lower portion of lever 44 includes a camming surface 52 which bears on the upper surface of the cover 22. When the lever 44 is rotated downwardly to a horizontal position, i.e., resting on the upper surface of the housing 22, the stubs 46 move downwardly to allow the cup 40 and the clamping member 36 to be biased downwardly under the influence of the spring 38 to clamp the line 18 against the surface of the opening 30 as illustrated in FIG. 2b. When the lever 44 is rotated upwardly to a near vertical position (restricted by the driveshaft 14), the cylindrical stubs 46 move axially-upwardly so as to bear against the top of the slots 50 in the cup 40 to lift the clamping member 36 away from the opening 30 in the base 24 to release the line 18 as illustrated in FIG. 2a. Note that the lever 40 has a somewhat rectangular projection 54 which projects upwardly when the lever 44 is in the horizontal position. This projection covers the upper portions of the slots 48 in the upper cylindrical housing 42. The slots 48 are necessarily this long to accommodate the upward excursions of the cylindrical stubs 46 when the lever 44 is raised to the near vertical position. The projections 54, by covering the upper portions of the slots 48, prevent the contamination of the clamping mechanism by dirt, grass, and the like.

With reference now to FIGS. 4 and 5, the path of the line 18 from the cavity formed by the cover 22 and base 24 through the rounded central opening 30 and the passage 32 is better illustrated. Note that the radially-outward portion 58 of the passage 32 is smoothly rounded in the plane of rotation of the line 18 to minimize the stresses on the line 18 and thereby minimize the incidence of line breakage.

If the line 18 breaks while in use, the break of the line 18 will ordinarily occur at or near the outlet portion 58 of the passage 32. Thus, a portion 60 of the line 18 will project from the opening 30 into the radially-extending passage 32. It is a relatively simple matter to move the lever 88 upwardly to release the line 18, to grasp the portion 60 and feed more line through the radially-extending passage 32. Once a sufficient amount of new line 18 has been fed from the coil, the lever 44 is rotated downwardly towards the horizontal position whereby the clamping member 36 will clamp the line 18. Note that since the line 18 is disposed in a center-fed coil within the compartment formed by the cover 22 and the base 24, there is no need for rotation of a spool or the like to feed the line. Therefore, there is no need to first release such a spool and then retighten the spool.

Figure 10:
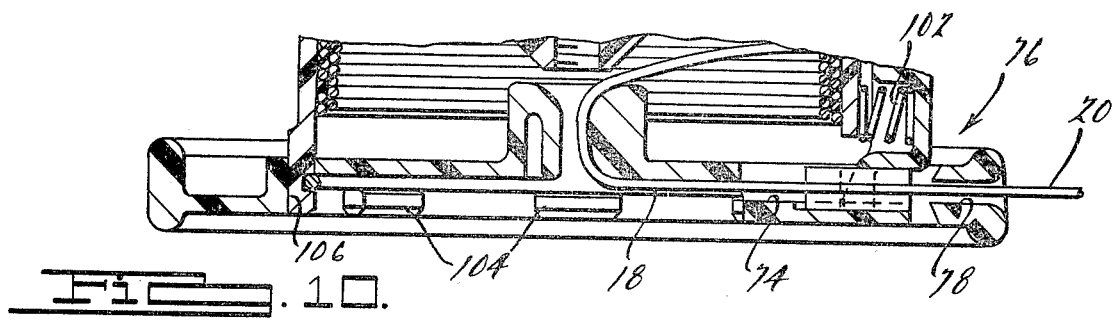
FIG. 10 is a partial cross-sectional view of the embodiment of FIG. 6 which illustrates the disposition and path of the trimming line.
Figure 11:
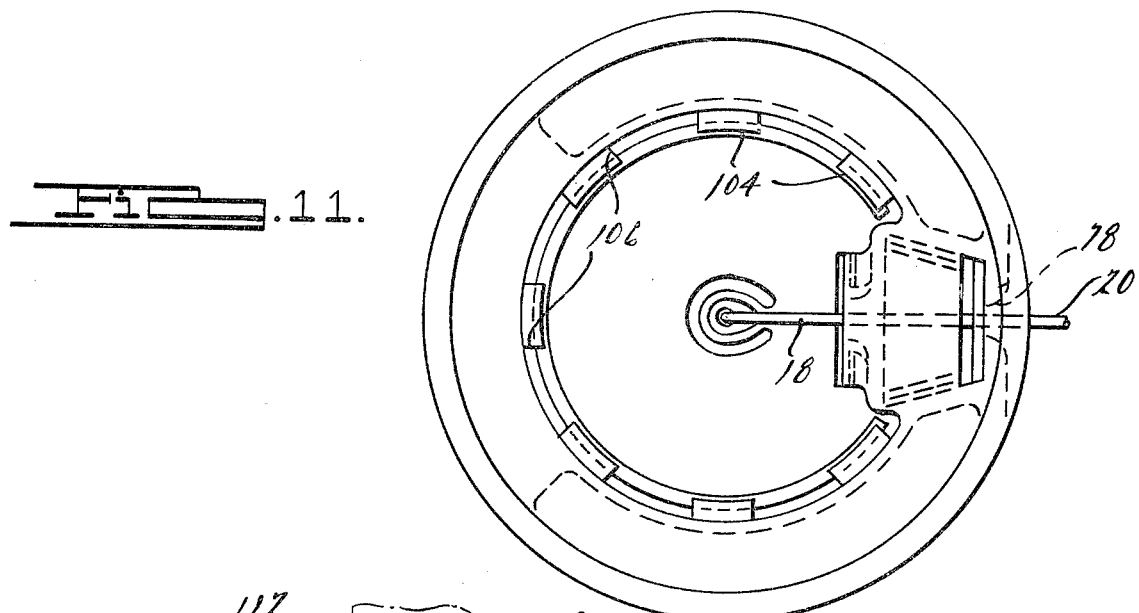
FIG. 11 is a bottom elevation view of the embodiment of FIG. 6.

In FIG. 6, a second embodiment 62 of a spoolless string trimmer is illustrated. The embodiment 62 has a cover 64 and a base 66. The cover 64 is provided with a threaded opening 68 which is adapted to secure the driveshaft 70 of the string trimmer so that the string trimmer head 62 may be rotated at high speed. The cover 64 may be secured to the base 66 by interlocking projections and openings as shown in FIGS. 10 and 11. The cover 64 and the base 66 form a compartment for a center-fed coil of line 18. The base 66 has a central axially-extending opening 72 which has rounded contours and through which the line 18 passes from the interior of the head 62 to the exterior of the head 62. The line 18 thereafter passes laterally through a radially-extending, partially-enclosed passage 74, a clamping mechanism 76 and a further radially-extending passage 78 so that its end 20 projects radially from the head 62 to accomplish its trimming function.

The clamping mechanism 76 is best seen with reference to FIG. 7. The clamping mechanism 76 has a pair of clamping members 80 and 82 which can be identical parts placed in opposition. The clamping members 80 and 82 have metallic clamping jaws 84 and 86 secured to the opposed faces of the clamping members 80 and 82 by means of a clip-on arrangement as illustrated. The clamping jaws 84 and 86 have serrations on their opposed faces to facilitate the clamping function. Note that the opposed faces of the clamping jaws 84 and 86 are contiguous the lateral passages 74 and 78 in a manner so that the line passes between the opposed faces of the opposed clamping jaws 84 and 86. The clamping members 80 and 82 have radially-skewed elongated slots 88 which mate with corresponding radially-skewed elongated rails 90 in the base 66. The slots 88 and rails 90 guide the movement of the clamping members 80 and 82 so that as the clamping members 80 and 82 move generally radially-inwardly with respect to the axis of rotation of the trimming head 62, the jaw members 84 and 86 diverge to release the line 18. When the clamping members 80 and 82 move generally radially-outwardly with respect to the axis of rotation, the slots 88 and rails 90 cause the jaw members 84 and 86 to converge onto the line 18 to clamp the line 18.

Movement of the clamping members 80 and 82 is accomplished by a button member 92 which has a pair of downwardly-extending prongs or dogs 94 which are disposed in openings 96 in respective ones of clamping members 80 and 82. The button member also has an upper flange 98 which cooperates with an opening 100 in the cover 64 so as to retain the button member 92 with respect to the cover 64. A spring 102 is disposed in the chamber 100 and bears against the button member 92 to bias the bottom member 92 radially-outwardly, and to likewise bias the clamping members 80 and 82 radially-outwardly by virtue of the connection of the button member 92 with the clamping members 80 and 82 provided by the prongs or dogs 94 and the openings 96. Consequently, normally the clamping members 80 and 82 will be biased radially-outwardly under the influence of the spring 102 to clamp the line 18. However, when the button member 92 is depressed, i.e., moved radially-inwardly, the clamping members 80 and 82 will move radially-inwardly along the rails 90 to cause the clamping members 80 and 82 to diverge and release the line 18. Once the line 18 is released, the line 18 can be fed through the radially-extending passage 74, the clamp 76, and the further radially-extending passage 78 to replace broken portions of the line 18. The feed path of the line 18 through the radially-extending passage 74, the clamp 76, and the further radially-extending passage 78 can be best seen in FIGS. 10 and 11. Also, in FIG. 10, the tabs 104 which reside in the slots 106 can be seen in FIG. 10. With reference to FIG. 11, it will be noted that the further radially-extending passage 78 has a rounded contour in the plane of rotation of the line 18 so as to minimize the stresses on the line 18.

Figure 12:
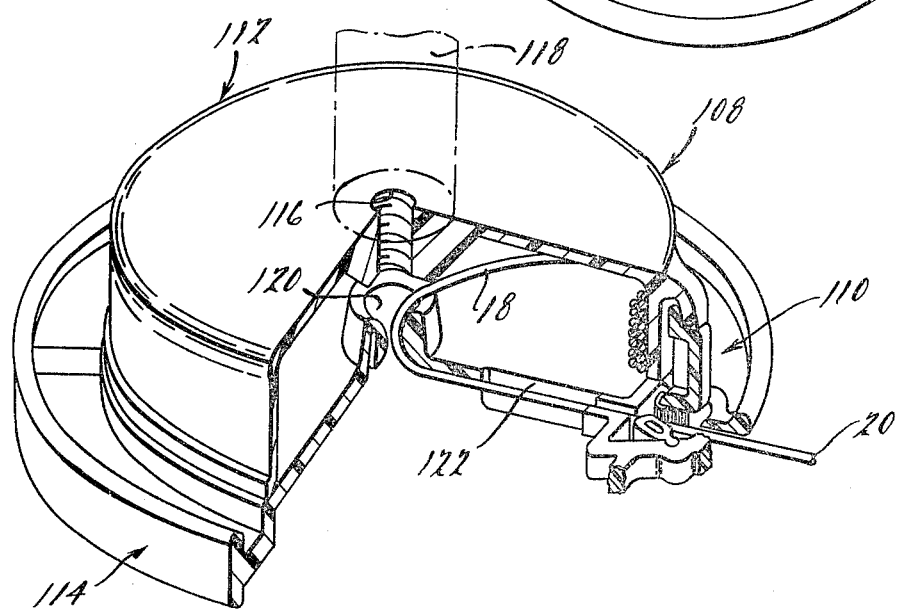
FIG. 12 is a perspective, partially-cutaway view of a third embodiment of the present invention.
Figure 15:
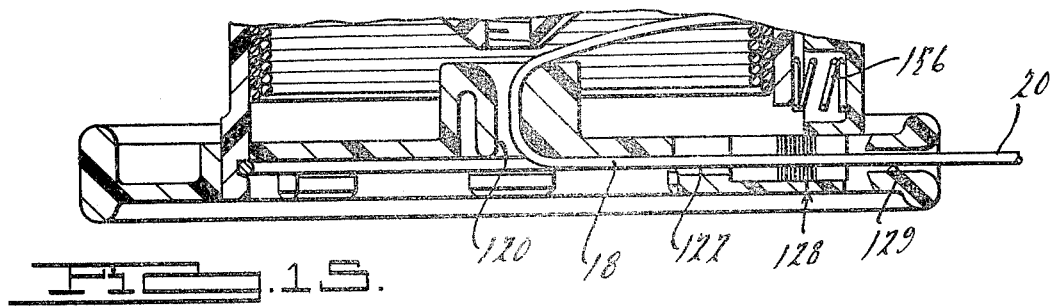
FIG. 15 is a partial cross-sectional view of the embodiment of FIG. 12 which illustrates the disposition and path of the trimming line.
Figure 16:
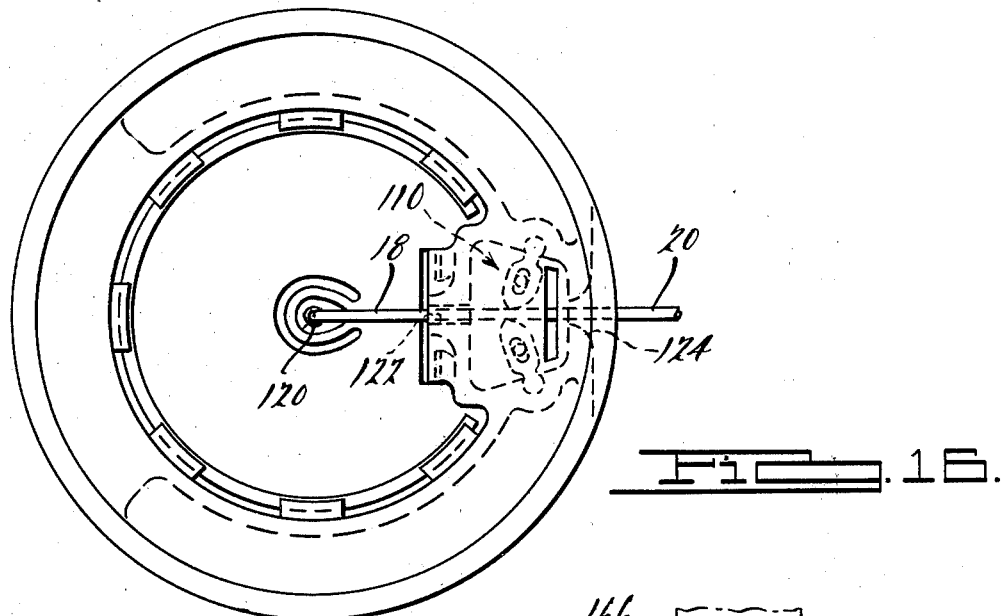
FIG. 16 is a bottom elevation view of the embodiment of FIG. 12.

In FIG. 12, a third exemplary embodiment of a string trimming head 108 is illustrated which includes a clamping mechanism 110 which is a modification of the clamping mechanism 76 of the embodiment of FIG. 6. The embodiment 108 has a cover 112 and a base 114. The cover 112 is provided with a threaded opening 116 which is adapted to secure the driveshaft 118 of the string trimmer so that the string trimmer head 108 may be rotated at high speed. The cover 112 may be secured to the base 114 by interlocking projections and openings as shown in FIGS. 15 and 16. The cover 112 and the base 114 form a compartment for a centerfed coil of line 18. The base 114 has a central, axially-extending opening 120 which has rounded contours and through which the line 18 passes from the interior of the head 108 to the exterior of the head 108. The line 18 thereafter passes laterally through a partially-enclosed, radially-extending passage 122, the clamping mechanism 110 and a further radially-extending passage 124 (shown in FIGS. 14 and 15) so that its free end 20 projects radially-outwardly from the head 108 to accomplish its trimming function.

Figure 13:
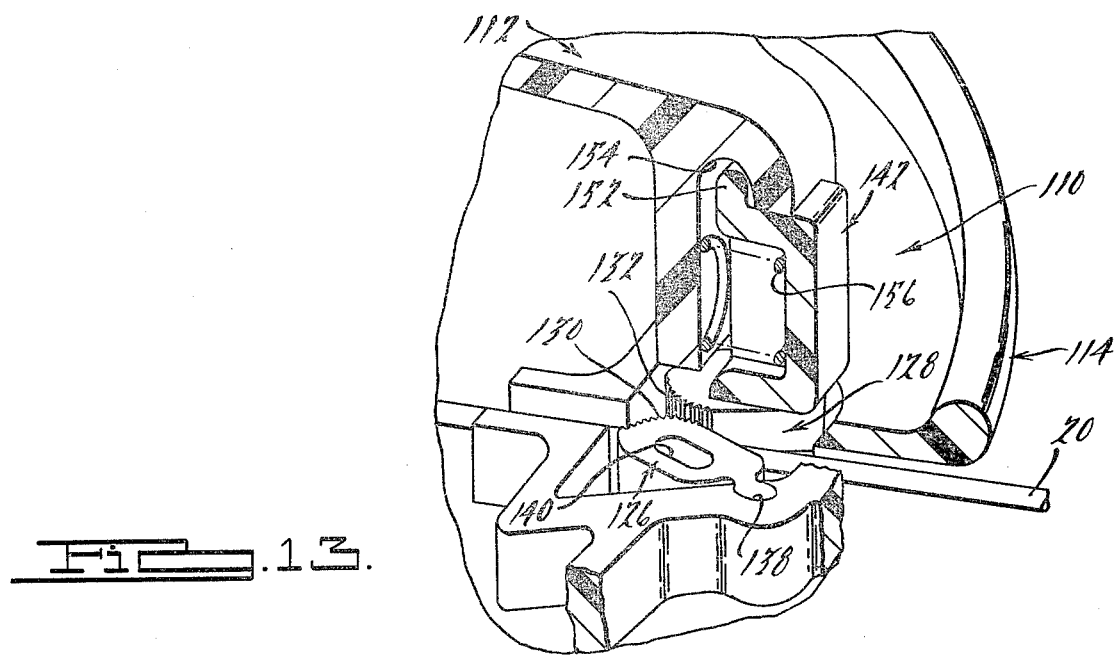
FIG. 13 is an enlarged, perspective, partially-cutaway view of the clamping mechanism of the embodiment of FIG. 12.

The clamping mechanism 110 is best seen with reference to FIG. 13. The clamping mechanism 110 has a pair of clamping members 126 and 128 which can be identical parts placed in opposition. The clamping members 126 and 128 have opposed serrated clamping surfaces 130 and 132 to facilitate the clamping function. Note that the clamping surfaces 130 and 132 are contiguous to the lateral passages 122 and 124 in a manner so that the line passes between the serrated surfaces 130 and 132 of the clamping members 126 and 128.

Figure 14:
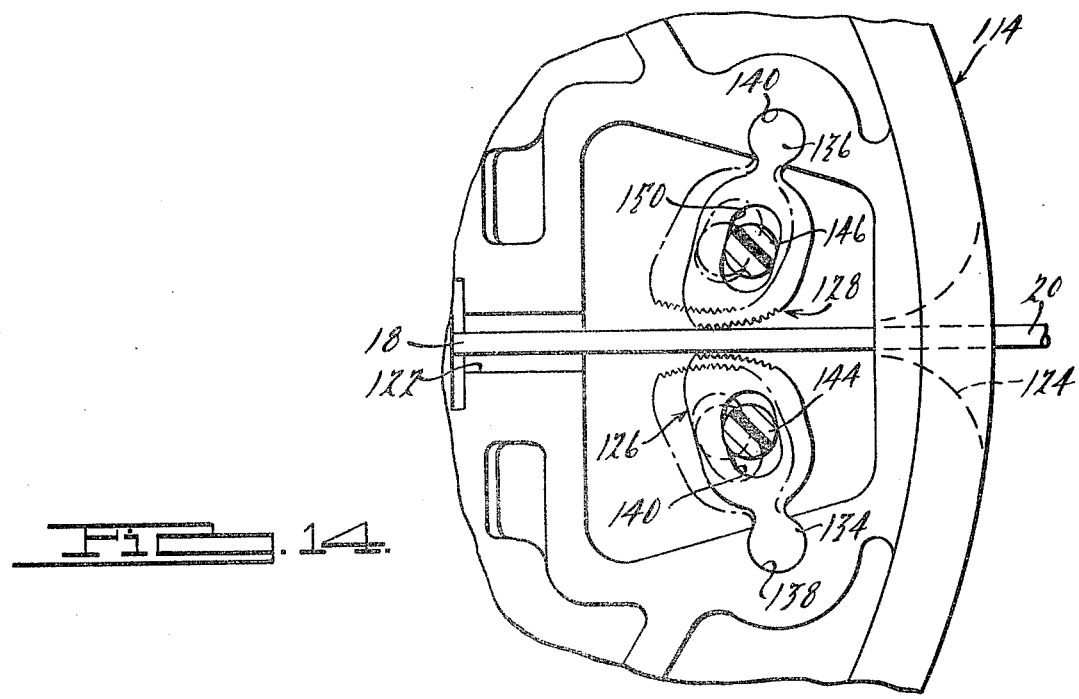
FIG. 14 is a partial cross-sectional view of the clamping members of the embodiment of FIG. 12.

As best seen in FIG. 14, the clamping members 126 and 128 have integral projections 134 and 136 which are substantially cylindrical in configuration and which reside in mating, substantially-cylindrical recesses 138 and 140 in the base member 114. The cylindrical projections 134 and 136 and the cylindrical recesses 138 and 140 interlock in a fashion to allow the clamping members 126 and 128 to pivot about the axis of the cylindrical projections and recesses. The pivotal movement of the clamping members 126 and 128 is restricted but is adequate to allow the clamping members 126 and 128 to move apart sufficiently to release the line 18 when the clamping member 126 moves counterclockwise as seen in FIG. 14 and the clamping member 128 moves clockwise as seen in FIG. 14. Such pivotal movement of the clamping members 126 and 128 is effected by inward movement of a button member 142 which has two downwardly-projecting prongs or dogs 144 and 146 which reside in slots 148 and 150 in clamping members 126 and 128, respectively. As the button member 142 is pushed inwardly, the projections 144 and 146 bear against the walls of the slots 148 and 150, and slide therealong, to rotate the clamping members 126 and 128 counterclockwise and clockwise, respectively. The button member 142 also has an upper flange 152 which cooperates with an opening 154 in the cover 112 so as to retain the button member 142 with respect to the cover 112. A spring 156 is disposed in the chamber 154 and bears against the button 142 to resilient bias the buttom member 142 radially-outwardly and therefore bias the clamping members 126 and 128 clockwise and counter-clockwise, respectively, by virtue of the connection of the button member 142 to the clamping members 126 and 128 provided by the prongs or dogs 144 and 146 and the openings 148 and 150. Consequently, normally the clamping members 126 and 128 will be biased toward one another under the influence of the spring 156 to clamp the line 18. However, when the button member 142 is depressed, i.e., moved radially-inwardly, the clamping members 126 and 128 will move counterclockwise and clockwise, respectively, to cause the clamping surfaces of the clamping members 126 and 128 to diverge and release the line 18. Once the line 18 is released, the line 18 can be fed through the radially-extending passage 122, the clamping mechanism 110 and the further radially-extending passage 124 to replace broken portions of the line 18.

The lateral feed path of the line 18 from the radially-extending passage 122, the clamping mechanism 110 and the further radially-extending passage 124 can be best seen in FIGS. 14–16. With reference to those figures, it will be noted that the further radially-extending passage 124 has a rounded contour in the plane of rotation of the line 18 so as to minimize the stresses on line 18.

Figure 17:
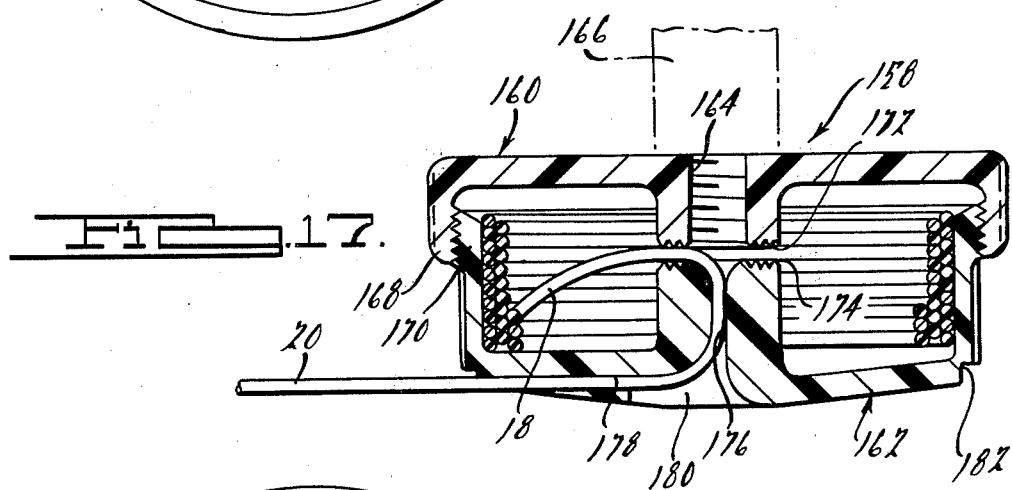
FIG. 17 is a cross-sectional view of a fourth embodiment of the present invention.

In FIG. 17, a cross-sectional view of a fourth embodiment 158 of a string trimmer according to the present invention is illustrated. The string trimmer 158 has a cover 160 and a base 162. The cover 160 is provided with a threaded opening 164 which is adapted to secure the driveshaft 166 of the string trimmer so that the string trimmer head 158 may be rotated at high speed. The cover 160 is secured to the base 162 by threadedly-engaged, axially-extending flange portions 168 and 170, respectively. The cover 160 is provided with a serrated clamping surface 172 while the base 162 is provided with an opposed serrated clamping surface 174. Note that the opposed clamping surfaces 172 and 174 are annular and generally lie in a plane which is perpendicular to the axis of rotation of the trimming head 158. The cover 160 and base 162 form a compartment for a center-fed coil of line 18. The line 18 extends inwardly past the clamping surfaces 172 and 174, downwardly through an axially-extending passage 176 which is coaxially disposed relative to the axis of rotation of the head 158, and thereafter laterally through a partially-enclosed, radially-extending passage 178 so that its free end 20 projects radially-outwardly from the head 158 to accomplish its trimming function.

When the base 162 is rotated relative to the cover 160 in one direction, the base 162 and cover 160 will move axially apart by virtue of the threaded engagement between the flanges 168 and 170. Such movement, of course, moves the clamping surfaces 172 and 174 apart to release the line 18. When the base 162 is rotated relative to the cover 160 in the opposite direction, the clamping surfaces 172 and 174 move together to clamp the line 18. Consequently, the relative rotation of the base 162 and the cover 160 can be used to release the line 18 for feeding the line 18 from the coil through the axial passage 176 and the radially-extending passage 178 to replace broken line. Thereafter, the base 162 and the cover 160 can be rotated in the opposite direction to clamp the line 18 for further use of the trimming head 158.

Figure 18:
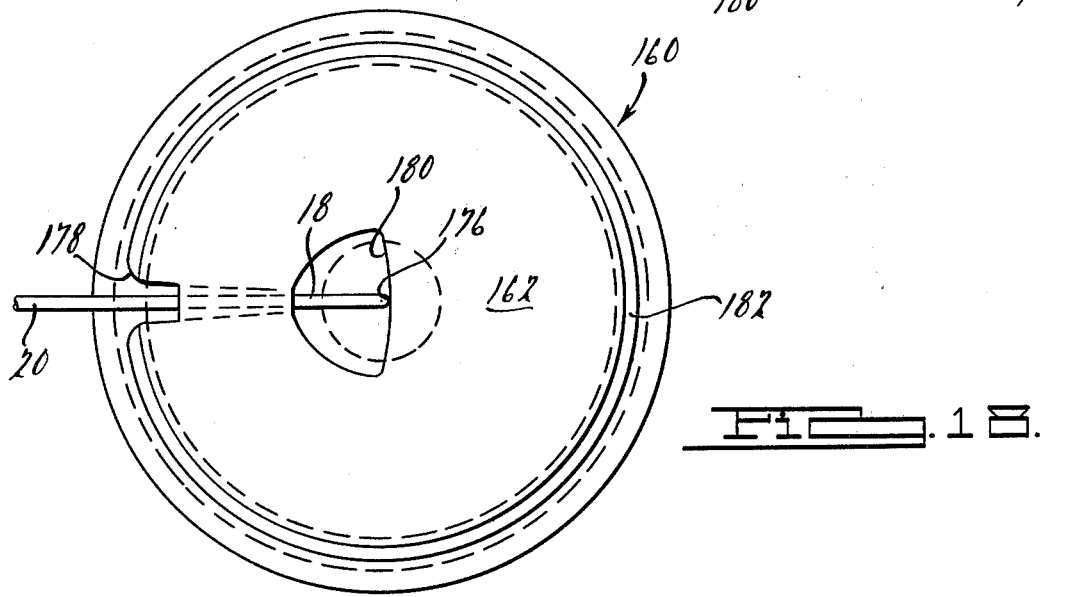
FIG. 18 is a bottom elevation view of the fourth embodiment of FIG. 17.

With reference to FIG. 18, it can be seen that the passage 178 has smoothly rounded contours in the plane of rotation of the line 18 at its radially-outward extremity. The smoothly rounded contour minimizes line stress and breakage. Note also that a generous valley or relief contour 180 is provided in the lower surface of the base 162 to facilitate grasping of the line 18 for feeding the line 18 from the axially-extending passage 176 into the radially-extending passage 178.

As can be seen in FIGS. 17 and 18, the outer periphery of the housing 162 is provided with a recess 182 at the lower edge thereof. The recess 182 communicates with the passage 178 and has a depth in the radial and axial directions which is somewhat greater than the diameter of the trimming line 18. Should the head 158 strike an obstruction either axially or radially, the trimming line 18 will deflect into the recess 182 and thereby be protected from substantial damage.

Figure 19:
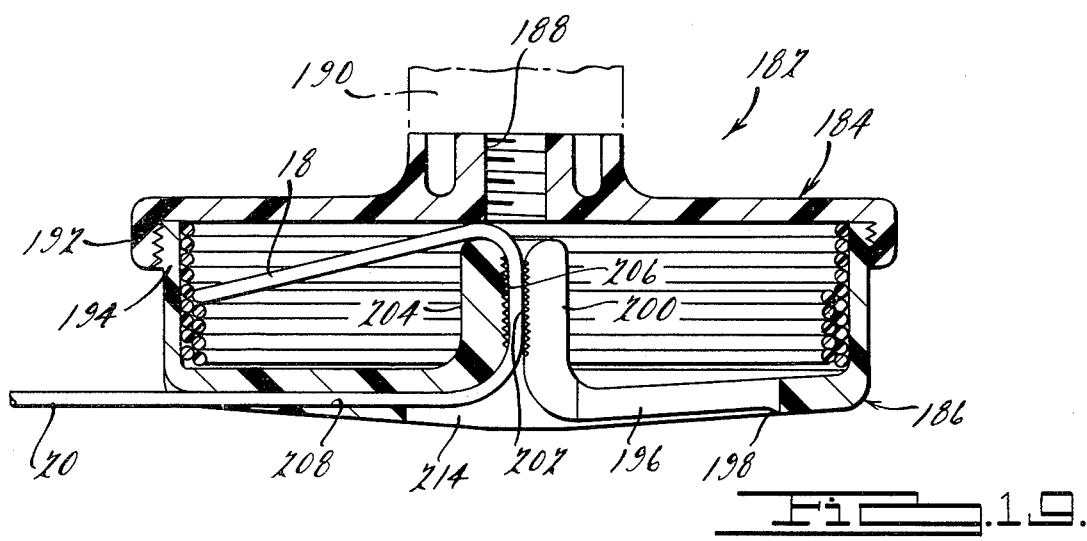
FIG. 19 is a cross-sectional view of a fifth embodiment according to the present invention.

In FIG. 19, a cross-sectional view of a fifth embodiment 182 of a string trimmer according to the present invention is illustrated. The string trimmer 182 has a cover 184 and a base 186. The cover 184 is provided with a threaded opening 188 which is adapted to secure a driveshaft 190. The cover 184 is secured to the base 186 by threadedly-engaged, axially-extending flange portions 192 and 194, respectively. The base 186 has an integral, radially-extending clamping member 196 which is cantilevered relative to the base 186 at its radially-outward end 198. At its radially-inward end, the clamping lever 196 has an integral upwardly-extending clamping portion 200 which has a serrated face 202. The base 186 also has an integral, upwardly-extending clamping portion 204 with a serrated face 206 which opposes the serrated face 202 on the clamping lever 196.

Figure 20:
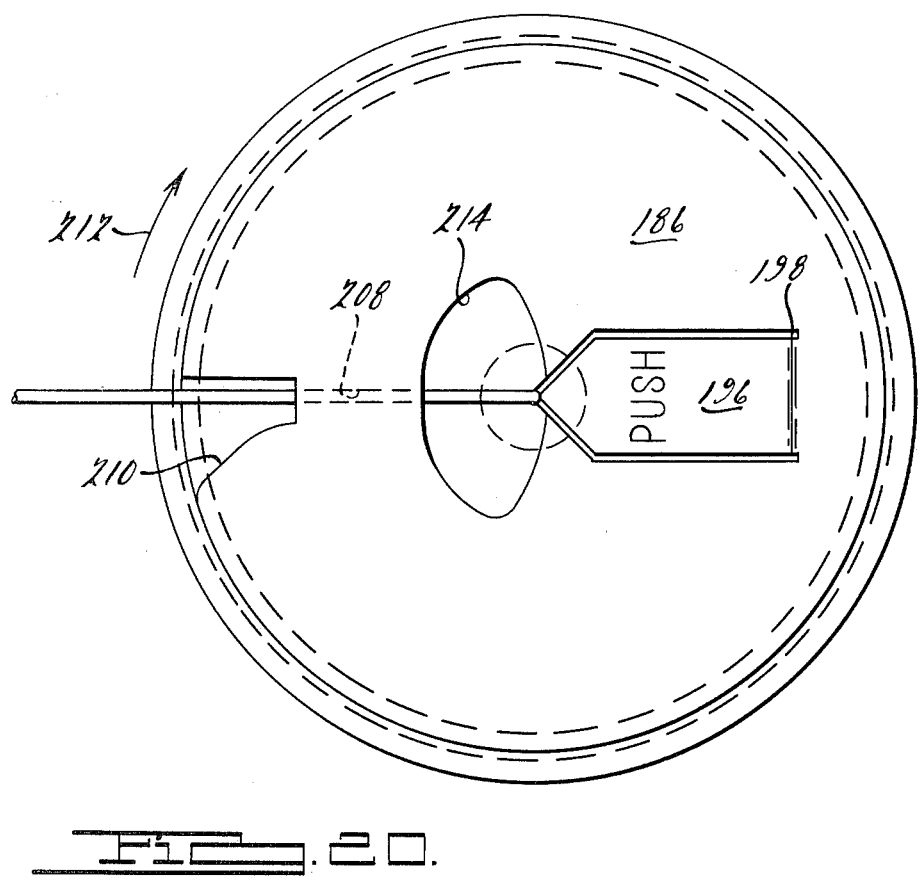
FIG. 20 is a bottom elevation view of the fifth embodiment of FIG. 19.

The material, configuration and cross-section of the clamping lever 196 is such that it may be flexed upwardly by pressing on the clamping lever in the direction of the cover 184 as indicated by the word "PUSH" in FIG. 20. When the clamping lever 196 is depressed upwardly, the clamping surface 202 on the clamping lever 196 moves away from the clamping surface 206 on the clamping portion 204 to release the line 18. When the lever 196 is released, it returns to the position illustrated in FIG. 19 so as to clamp the line 18 between clamping surface 202 and the clamping surface 206.

The cover 184 of the base 186 forms a compartment for storing a center-fed coil of trimming line 18. The trimming line 18 is fed from the coil near the center of the head 182, downwardly past the clamping surfaces 202 and 206 and through a radial passage 208 so that its free end 20 projects radially-outwardly from the head 182 to accomplish its trimming function when the head 182 is rotated at high speed.

With reference to FIG. 20, note that the radial passage 208 has a rounded contour in the plane of rotation of the line 18 at its radially-outward portion which minimizes the stresses placed on the line 18. Since the head 182 rotates in the direction of arrow 212, only the surface 210 which faces the direction of rotation need be rounded. Note also that a generous relief contour or valley 214 is provided in the bottom surface of the base 182 to facilitate grasping of the line 18 where it exits the head 182 at the clamping surfaces 202 and 206.

The major components of the trimming heads disclosed herein can be economically fabricated out of a moldable plastic material. For example, a plastic material manufactured by Allied Chemical under the designation XP853 may be used. Alternatively, a moldable plastic such as nylon may be used.

It should be noted that the clamping structures of each embodiment, except the embodiment 158 of FIGS. 17 and 18, is arranged so that a pull on the free end 20 of line 18 tends to increase the clamping forces since the engagement between the line 18 and the clamping member creates a frictional force which, in response to a pull on the free end 20 of the line 18, acts in a direction to move the clamping member increasingly in the clamped position.

In FIG. 21, a trimming unit 218 is shown which advantageously utilizes the trimming head 10. Alternatively, the trimming unit 218 could use the trimming head 62, 108, 158 or 182. The trimming unit 218 includes a source of motive power 220, in this case, a two-cycle internal combustion engine, an elongated frame 22, and appropriate handles 224 and 226. The handles 224 and 226 are positioned and configured for convenient operation of the trimming unit 218. The motor 220 has an output shaft (not shown) which is connected to a flexible driveshaft 14. The flexible driveshaft is also illustrated variously herein as driveshaft 70, 118, 166 and 190. The trimming head 10, or for that matter, the trimming head 62, 108, 158 or 182, advantageously and uniquely cooperates with components 220-226 in that it is of an appropriate size, weight and function to readily substitute for existing trimming head designs so that its unique advantages can be obtained with existing trimming units.

In FIG. 22, another embodiment of a trimming unit 228 is illustrated. The trimming unit 228 uses an electric motor 230 which maybe operated by 110 volt AC current or by DC batteries. The electric motor has an output shaft (not shown) which is connected to the trimming head 10 or the trimming head 62, 108, 158 or 182. The trimming unit 228 has an appropriate elongated frame 234 and handles 236 and 238 for manipulating the trimming unit 228. In this combination, the trimming head 10, 62, 108, 158 or 182 advantageously and uniquely cooperates with the components 230-238 in that it is of an appropriate size, weight and function to readily substitute for existing trimming head designs whereby its unique advantages can be obtained with existing trimming units.

It is to be understood that the foregoing description is that of preferred embodiments of the invention. Various changes and modifications may be made by one skilled in the art without departing from the spirit and scope of the invention as defined by the appended claims.

What is claimed is:

1. A head for a trimmer using flexible trimming line as the cutting implement comprising:
   housing means for containing a coil of trimming line, said housing means having an opening therethrough for egress of said trimming line, said opening being disposed in communication with the center of said coil so that said trimming line can be fed from the center of said coil through said opening to project the free end of said trimming line generally radially-outwardly from said housing means, said housing means being adapted to be rotated at high speed to rotate said coil and the generally radially-outwardly projecting free end of said trimming line therewith; and clamping means associated with said housing means for securing said trimming line during rotation of said housing means and for releasing said coil through said opening without rotation of said coil said clamping means comprising;

a button member which is manually movable with respect to said housing means for releasing and clamping said trimming line;

a clamping member resiliently biased in a direction to cause clamping of said trimming line and which is movable against said resilient bias when said button member is manually moved to release said trimming line; and pivot means for permitting rotation of said clamping member about said pivot means in one direction to clamp said trimming line.

2. A trimmer head according to claim 1 wherein said pivot means includes a cylindrical recess and a cylindrical projection residing in said recess, one of said recess and said projection being associated with said housing means and the other of said recess and projection being associated with said clamping member, said recess and said projection causing said clamping member to rotate about the axis of said recess and said projection in one direction to release said trimming line and in the other direction to clamp said trimming line.

3. A trimmer head according to claim 2 wherein said resilient bias is provided by a spring member.

4. A head for a trimmer using flexible trimming line as the cutting implement comprising:

housing means for containing a coil of trimming line, said housing means including a base having an opening therethrough and a lateral passage disposed in communication with said opening so that said trimming line can be fed from the center of said coil through said opening and said lateral passage to project the free end of said trimming line generally radially-outwardly from said housing means, said housing means being adapted to be rotated at high speed to rotate said coil and the generally radially-outwardly projecting free end of said trimming line therewith; and clamping means associated with said housing means for securing said trimming line during rotation of said housing means and for releasing the trimming line for feeding of said trimming line from the center of said coil through said opening and said lateral passage without rotation of said coil, said clamping means including a clamping member disposed contiguous said lateral passage, a manually-movable operating member operatively connected to said clamping member to move said clamping member upon movement of said manually-movable operating member, and movement defining means including pivot means associating said clamping member with said housing means to define the movement of said clamping member and permitting rotation of said clamping member about said pivot means so that said clamping member moves to release said trimming line when said manually-movable operating member is moved in one direction and so that said clamping member moves to clamp said trimming line contiguous said lateral passage when said manually-movable operating member moved in another direction.

5. A trimmer head according to claim 4 further having a second clamping member disposed contiguous said lateral passage and in opposition to said first-mentioned clamping member, said manually-movable operating member being operatively connected to said second clamping member to move said clamping member upon movement of said manually-movable operating member, further includes second pivot means associating said second clamping member with said housing means to define the movement of said second clamping member and permitting rotation of said second clamping member about said second pivot means so that said second clamping member moves to release said trimming line when said manually-movable operating member is moved in said one direction and so that said second clamping member moves to clamp said trimming line between said first-mentioned clamping member and said second clamping member when said manually-movable operating member is moved in said other direction.

6. A trimmer head according to claim 5 wherein said first pivot means includes first cylindrical recess and first cylindrical projection residing in said first recess, one of said first recess and said first projection being associated with said housing means and the other of said first recess and said first projection being associated with said first-mentioned clamping member, said first recess and said first projection causing said first-mentioned clamping member to rotate about the axis of said first recess and said first projection in said first direction to release said trimming line and in said second direction to clamp said trimming line.

7. A trimmer head according to claim 6 wherein said second pivot means includes a second cylindrical recess and a second cylindrical projection residing in said second recess, one of said second recess and said second projection being associated with said housing means and the other of said second recess and said second projection being associated with said second clamping member, said second recess and said second projection causing said second clamping member to rotate about the axis of said second recess and said second projection in said second direction to release said trimming line and in said first direction to clamp said trimming line.

8. A trimmer head according to claim 7 further including means for resiliently biasing said first-mentioned and said second clamping members in said second and first directions, respectively, to clamp said trimming line between said first and second clamping members contiguous said lateral passage.

9. A trimmer head according to claim 8 wherein said manually-movable operating member is movable in said one direction against said resilient bias to move said first-mentioned and said second clamping members in said first and second directions, respectively, to release said trimming line.

* * * * *